US011913396B2

(12) United States Patent
Schaible et al.

(10) Patent No.: US 11,913,396 B2
(45) Date of Patent: Feb. 27, 2024

(54) METHOD FOR HEATING A CATALYTIC CONVERTER

(71) Applicant: Mercedes-Benz Group AG, Stuttgart (DE)

(72) Inventors: Andreas Schaible, Weil im Schoenbuch (DE); Andreas Schober, Altbach (DE); Hans-Georg Lehmann, Esslingen (DE); Markus Schilling, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/247,819

(22) PCT Filed: Mar. 31, 2022

(86) PCT No.: PCT/EP2022/058677
§ 371 (c)(1),
(2) Date: Apr. 4, 2023

(87) PCT Pub. No.: WO2022/228824
PCT Pub. Date: Nov. 3, 2022

(65) Prior Publication Data
US 2023/0349338 A1 Nov. 2, 2023

(30) Foreign Application Priority Data

Apr. 26, 2021 (DE) .................... 10 2021 002 188.6

(51) Int. Cl.
F02D 41/02 (2006.01)
F02D 41/14 (2006.01)

(52) U.S. Cl.
CPC ..... F02D 41/0255 (2013.01); F02D 41/1454 (2013.01)

(58) Field of Classification Search
CPC .................... F02D 41/0255; F02D 41/1454
See application file for complete search history.

(56) References Cited

U.S. PATENT DOCUMENTS 4,385,491 A * 5/1983 Sakurai ............... F01N 3/222
251/129.05
5,285,639 A * 2/1994 Araki ................... F01N 3/22
60/276

(Continued)

FOREIGN PATENT DOCUMENTS

DE              44 16 870 C2    11/1995
DE      10 2015 015 484 B3     3/2017
WO         WO 2018/083400 A1    5/2018

OTHER PUBLICATIONS

PCT/EP2022/058677, International Search Report dated Jul. 19, 2022 (Two (2) pages).

Primary Examiner — Jesse S Bogue
(74) Attorney, Agent, or Firm — Crowell & Moring LLP

(57) ABSTRACT

A method for heating a catalytic converter includes a) switching on a compressor; b) at least partially opening an injection valve; c) setting a combustion-air/fuel ratio of λ<1 in combustion chambers; d) detecting an actual value of the oxygen content in the exhaust gas; and e) comparing the actual value with a target value, where the target value corresponds to an exhaust-gas oxygen content that would be set in a region of the catalytic converter if the combustion-air/fuel ratio in the combustion chambers is approximately λ=1, where a manipulated variable output by a controller on a basis of a deviation of the actual value from the target value is kept constant when the actual value reaches one of two limit values of a value range within which the target value is ranged, and where the two limit values deviate from the target value by approximately 3%.

8 Claims, 3 Drawing Sheets

(56) References Cited

U.S. PATENT DOCUMENTS

| | | | |
|---|---|---|---|
| 5,381,658 A * | 1/1995 | Meguro | F01N 11/007 |
| | | | 60/276 |
| 11,105,285 B2 * | 8/2021 | Nee | F02D 41/029 |
| 2018/0058289 A1 | 3/2018 | Lee et al. | |
| 2020/0191084 A1 * | 6/2020 | Baron Von Ceumern-Lindenstjerna | F02D 41/068 |

* cited by examiner

METHOD FOR HEATING A CATALYTIC CONVERTER

BACKGROUND AND SUMMARY OF THE INVENTION

The invention relates to a method for heating a catalytic converter while simultaneously reducing raw emissions, which catalytic converter is arranged in an exhaust system of a spark-ignition internal combustion engine.

DE 44 16 870 C2 describes a method for supplying fuel and combustion air to a combustion engine, in which, in addition to the combustion air, compressed air is also supplied to the combustion engine as additional combustion air. A catalytic converter is arranged in an exhaust line of the internal combustion engine, the operation of which is regulated as a function of a respective condition of the fuel/air mixture of the internal combustion engine. Here, electronic control means switch off the regulation of the catalytic converter each time the supply of the additional combustion air is switched on.

The disadvantage here is that the catalytic converter, which is then operated in an unregulated manner, can no longer perform its function of converting pollutants contained in the exhaust gas to a sufficient extent.

It is therefore the object of the present invention to provide a method for heating a catalytic converter, by means of which method improved conversion of pollutants can be achieved.

In the method for heating a catalytic converter which is arranged in an exhaust system of a spark-ignition internal combustion engine, a control unit outputs a respective manipulated variable to an electrically driven additional compressor and to at least one injection valve. As a result of the at least one injection valve being at least partially opened here, air compressed by the additional compressor can be introduced, downstream of exhaust valves of the internal combustion engine, into the exhaust system. The exhaust valves are assigned to respective combustion chambers of the internal combustion engine. Signals from at least one oxygen sensor are supplied to the controller of the control unit. An oxygen content in the exhaust gas fed to the catalytic converter is detected by means of the at least one oxygen sensor.

The method comprises the following steps:
a) switching on the additional compressor;
b) at least partially opening the at least one injection valve;
c) setting a combustion-air/fuel ratio of $\lambda<1$ in the combustion chambers of the internal combustion engine;
d) detecting the actual value of the oxygen content in the exhaust gas by means of the at least one oxygen sensor;
e) comparing the actual value with a target value of the oxygen content, the target value corresponding to that exhaust-gas oxygen content that would be set in the region of the catalytic converter when the combustion-air/fuel ratio in the combustion chambers of the internal combustion engine is approximately $\lambda=1$, and wherein a manipulated variable output by the controller on the basis of a deviation of the actual value from the target value is kept constant when the actual value reaches one of two limit values of a value range within which the target value is located, wherein the two limit values that delimit the value range deviate from the target value by approximately 3%.

By keeping the manipulated variable output by the controller constant in step e) only when the actual value reaches one of the two limit values, it can be ensured that the manipulated variable is effectively frozen only when the actual value has come comparatively close to the target value. In this way, unwanted controller oscillations can be prevented to a very large extent, and the target value is reliably reached. In particular, one of the two limit values can be approximately 3% above the target value, with the other of the two limit values being approximately 3% below the target value.

It is further conceivable that the target value of the oxygen content of the exhaust gas is set to a value for which an exhaust gas lambda value of the exhaust gas of approximately 1.05 results. With the deviation of the oxygen content in the exhaust gas from the predetermined target value of approximately +/−3% provided according to the invention, the exhaust gas lambda value thus remains greater than 1, whereby an emission of a comparatively small amount of emitted pollutants into the ambient air can advantageously be achieved. Likewise, if the target value is set to 1.05, the exhaust gas lambda value remains less than 1.1, so that advantageously no cooling effects are caused by the secondary air for the catalytic converter.

By means of this method, conversion of pollutants can be improved. In particular, raw emissions of the internal combustion engine, which is preferably an internal combustion engine of a motor vehicle, can be reduced to a particularly great extent following a cold start of the internal combustion engine.

Furthermore, the time required to heat up the catalytic converter can be greatly reduced so that the catalytic converter reaches its start-up temperature or light-off temperature very quickly. This means that the catalytic converter can be used to convert the pollutant emissions of the internal combustion engine very early on. For this purpose, the injection of the compressed air or secondary air, which is realized by means of the electrically driven additional compressor, is a very efficient method.

As a result of setting the combustion-air/fuel ratio to $\lambda<1$ in step c), the exhaust gas produced during rich combustion contains a high proportion of hydrocarbons (HC) and carbon monoxide (CO). This applies in particular if in step c) a rich combustion-air/fuel ratio is set from a range of approximately $\lambda=0.7$ to $\lambda=0.9$ in a combustion chamber of the internal combustion engine. These HC emissions and CO emissions from the internal combustion engine are exothermically oxidized by the oxygen which, together with the compressed air or secondary air, is introduced into the exhaust gas fed to the catalytic converter. It is the electric additional compressor which introduces the compressed air into the exhaust gas, with the at least one injection valve being at least partially open at the same time, which valve can therefore also be referred to as a compressor air injection valve.

The exothermic oxidation of the hydrocarbons (HC emissions) and of the carbon monoxide (CO emissions) raises the temperature of the exhaust gas fed to the catalytic converter. The pollutants in the form of hydrocarbons and carbon monoxide contained in the raw emissions of the internal combustion engine are thus reacted with the oxygen, and this exothermic reaction heats or heats up the catalytic converter particularly quickly.

Furthermore, it is advantageous to set the rich combustion air ratio in the combustion chambers of the internal combustion engine to $\lambda<1$ (in particular $\lambda=0.7$ to 0.9), since in this way, the nitrogen oxide emissions are already kept particularly low in the combustion chamber. On the one hand, due to the exothermic after-burning of the HC emissions and CO emissions, the at least one catalytic converter is thus heated up particularly quickly. At the same time, the raw emissions that enter the surroundings of the motor vehicle equipped with the internal combustion engine via the exhaust system, for example, are reduced to a very great extent.

The exothermic reaction taking place upstream of the catalytic converter leads to a reduction of the pollutants contained in the raw emissions of the internal combustion engine, and in addition the catalytic converter is heated up particularly quickly, in particular following a cold start of the internal combustion engine. As a result, the combustion engine can operate at its optimum level of efficiency again early on, and the pollutants are reacted in the heated-up catalytic converter at a correspondingly early stage.

In real operation of the internal combustion engine, the emissions can therefore be adjusted particularly well and permanently, as is the case with a combustion-air/fuel ratio of $\lambda=1$. In this way, emissions are converted particularly comprehensively.

This applies equally if, in addition, heating-up and/or regeneration of a particulate filter, in particular an Otto particulate filter, arranged in the exhaust system takes place, and also if, for a high power output of the internal combustion engine, the internal combustion engine is operated with a rich combustion-air/fuel ratio, i.e., with a combustion-air/fuel ratio of $\lambda<1$.

Furthermore, the additional constructive outlay required is particularly low if the internal combustion engine already has the electrically driven or drivable additional compressor anyway. This is because it is only necessary to lay at least one line from this additional compressor to the injection point at which the air compressed by the additional compressor is introduced into the exhaust gas of the internal combustion engine. In addition, the injection valve must be attached to such a line. This can also be realized very simply and with little effort.

For the conversion of the HC emissions and the CO emissions, an optimum oxygen content can be set in the exhaust gas fed to the catalytic converter by controlling either the additional compressor or the injection valve by means of the controller. This exhaust gas lambda can be controlled accordingly at different operating points of a drive cycle.

Preferably, a higher-level operating strategy implemented in the control unit takes into account engine operating points, i.e., operating points of the internal combustion engine, and/or surroundings data. In particular, route planning data of a navigation system of the motor vehicle equipped with the internal combustion engine can be taken into account, as can car-to-car information.

Particularly on the basis of such parameters, a control strategy for an optimum exhaust gas lambda can be adapted in coordinated combination with an enrichment of the mixture of combustion air and fuel supplied to the combustion chambers of the internal combustion engine. In addition, an ignition angle adjustment, i.e., a shift of the ignition instant of a spark plug assigned to the respective combustion chamber to a later point in time, can be carried out.

The air compressed by means of the additional compressor can in particular be introduced into an exhaust manifold of the exhaust system. It is advantageous here if the point of introduction for the compressed air or secondary air is arranged as close as possible to the respective exhaust valves of the combustion chambers of the internal combustion engine.

The electrically driven additional compressor, which can in particular be integrated into a 48-volt on-board network of the internal combustion engine, is used here as a secondary air pump. In an advantageous manner, the additional compressor arranged on the internal combustion engine is designed to increase the performance or power output and/or torque output of the internal combustion engine as required by enabling the introduction of additional compressed air into the combustion chambers of the internal combustion engine by means of the electric additional compressor.

The electric additional compressor is preferably provided in addition to a compressor of an exhaust gas turbocharger, the turbine wheel of which is acted upon by the exhaust gas flowing through the exhaust system during operation of the internal combustion engine.

The method is advantageously compared to measures for heating up the catalytic converter that are also possible in principle in the form of internal engine measures such as a late adjustment of an ignition angle and an increase in the idling speed of the internal combustion engine. Furthermore, the effort associated with attaching a separate secondary air pump to a cylinder head of the internal combustion engine can be avoided. This is because if secondary air is introduced into the exhaust gas by means of such a separate secondary air pump at the cylinder head, installation space and lines must be made available for this separate air pump in particular.

Such interventions can, inter alia, have negative effects on the cooling performance of a cooling system of the internal combustion engine, in particular if a cooling jacket of the internal combustion engine is affected by the interventions. This in turn can lead to a desired performance of the internal combustion engine not being achieved because sufficient cooling of the internal combustion engine is not ensured.

In addition, such design interventions must be tested and adapted separately for each type of internal combustion engine. Subsequently, it is necessary to ensure the durability of the cylinder head by means of an endurance test of the internal combustion engine and by means of bench tests. These abovementioned disadvantages can advantageously be avoided in the method comprising steps a) to e).

In particular steps a), b) c) and d) of the method can be carried out simultaneously or in a sequence other than the conventional alphabetical order.

It is preferably provided that a speed of the additional compressor is pilot-controlled, and an opening width of the injection valve is adjusted in such a way that the predetermined target value of the oxygen content in the exhaust gas is set.

It is additionally or alternatively provided that an opening width of the at least one injection valve is pilot-controlled, and the speed of the additional compressor is controlled in such a way that the predetermined target value of the oxygen content in the exhaust gas is set.

It is preferably provided that the steps a) to e) of the method are carried out following a cold start of the internal combustion engine.

It is preferably provided that the steps a) to e) of the method are carried out when a speed of the internal combustion engine exceeds a threshold value of approximately 100 revolutions per minute.

It is preferably provided that the catalytic converter is operated as a three-way catalytic converter.

It is preferably provided that a proportional-integral controller is used as the controller.

Finally, it is preferably provided that in step c), in addition to setting the combustion-air/fuel ratio of $\lambda<1$ in the combustion chambers of the internal combustion engine, an ignition instant of a spark plug, assigned to the respective combustion chamber, of the internal combustion engine is shifted to an instant that is later in time than in normal operation of the internal combustion engine.

Further advantages, features and details of the invention result from the following description of preferred exemplary embodiments and on the basis of the drawings. The features and feature combinations mentioned above in the description, as well as the features and feature combinations mentioned below in the description of the figures and/or merely shown in the figures, can be used not only in the respectively given combination, but also in other combinations or on their own, without departing from the scope of the invention.

DETAILED DESCRIPTION OF THE DRAWINGS

In the figures, identical or functionally identical components are provided with the same reference signs.

Figure 1:
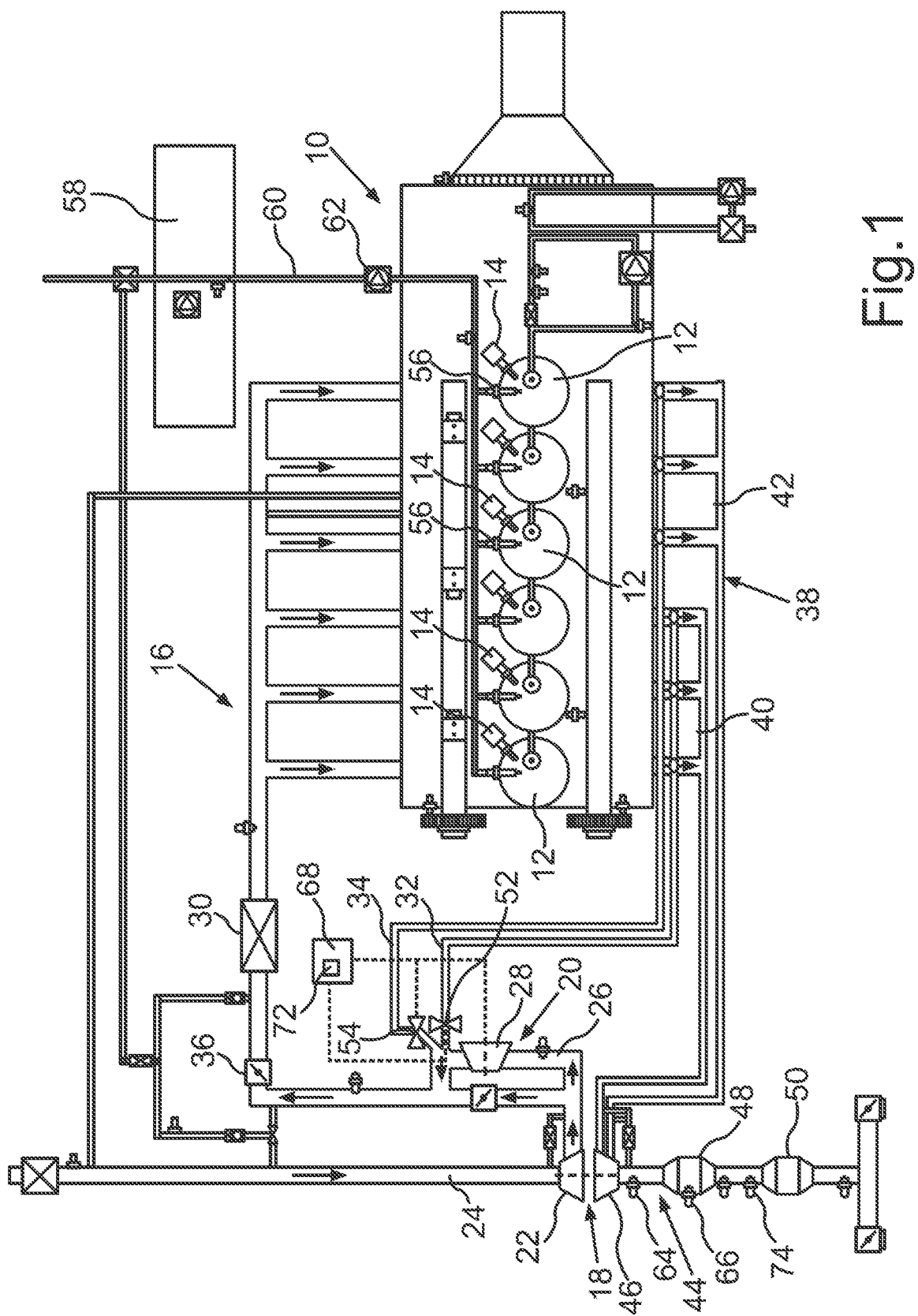
FIG. 1 schematically shows an internal combustion engine of a motor vehicle in which compressed air can be introduced either into an intake tract of the internal combustion engine or into an exhaust manifold of the internal combustion engine by means of an electrically driven additional compressor.

FIG. 1 schematically shows an internal combustion engine 10 of a motor vehicle which is designed as a spark-ignition internal combustion engine 10. Accordingly, respective spark plugs 14 are assigned to respective combustion chambers 12 of the internal combustion engine 10, of which only some are provided with a reference sign in FIG. 1 for reasons of clarity. Of these spark plugs 14, too, only some are provided with a reference sign in FIG. 1.

Compressed supply air can be supplied to the combustion chambers 12 of the internal combustion engine 10 via a supply air tract 16. In order to compress the supply air, an exhaust gas turbocharger 18 and an electrically driven additional compressor 20 are provided. A compressor wheel 22 of the exhaust gas turbocharger 18 is arranged in a line branch 24 of the supply air tract 16, via which the air to be compressed is drawn in. Downstream of the compressor wheel 22, a further line branch or branch line 26 branches off from the line branch 24.

A compressor wheel 28 of the additional compressor 20, which can be driven by means of an electric motor (not shown), is arranged in this branch line 26. Downstream of the compressor wheel 28 of the additional compressor 20, the branch line 26 rejoins the line branch 24. A throttle valve 36 is arranged in the line branch 24 downstream of the point at which the branch line 26 opens into the line branch 24. When the throttle valve 36 is open at least a little, the compressed air can flow through an intercooler 30, which is arranged in the line branch 24 of the supply air tract 16.

A first compressor air line 32 and a second compressor air line 34 branch off from the branch line 26 downstream of the compressor wheel 28 of the additional compressor 20. Via the compressor air lines 32, 34, the air compressed by means of the electric additional compressor 20 can be introduced into the exhaust gas of the internal combustion engine 10 downstream of exhaust valves (not shown) of the internal combustion engine 10, which are assigned to a respective combustion chamber 12.

In the present case, the air taken from the supply air tract 16 upstream of the throttle valve 36 and compressed by means of the additional compressor 20 is introduced into an exhaust manifold 38 of the internal combustion engine 10. Here, as shown by way of example in the present case, the exhaust manifold 38 can comprise a first exhaust gas stream 40 and a second exhaust gas stream 42.

The first exhaust gas stream 40 discharges exhaust gas which comes from a first group of the combustion chambers 12, for example from the first three of the six combustion chambers 12 shown by way of example in the present case. In contrast, exhaust gas from the internal combustion engine 10 is discharged via the second exhaust gas stream 42, which exhaust gas comes from a second group of the combustion chambers 12, in the present case therefore from three further combustion chambers 12 of the total of six combustion chambers 12 of the internal combustion engine 10 shown by way of example in FIG. 1.

If an exhaust system 44 of the internal combustion engine 10 is of single-stream design, i.e., has only one exhaust gas stream, only one of the compressor air lines 32, 34 shown by way of example in the present case need be provided in order to introduce the air or secondary air compressed by means of the additional compressor 20 into this exhaust gas stream.

In contrast, in the variant of the internal combustion engine 10 shown as an example here, the air compressed by means of the additional compressor 20 is introduced into the first exhaust gas steam 40 via the first compressor air line 32. Similarly, the compressed air or secondary air is introduced into the second exhaust gas stream 42 via the second compressor air line 34.

The exhaust gas flowing through the exhaust gas streams 40, 42 is supplied in a known manner to a turbine wheel 46 of the exhaust gas turbocharger 18 arranged in the exhaust system 44. Downstream of this turbine wheel 46, a first catalytic converter 48 and downstream of the first catalytic converter 48 a second catalytic converter 50 are arranged in the exhaust system 44.

The first catalytic converter 48 is designed as a three-way catalytic converter, while the second catalytic converter 50 can, for example, be designed as a nitrogen oxide storage catalytic converter. However, the following explanations also apply to an exhaust system 44 in which only one of the two catalytic converters 48, 50 shown as an example in FIG. 1 is arranged.

Since the first compressor air line 32 and the second compressor air line 34 are provided in the exemplary internal combustion engine 10 shown here, two injection valves 52, 54 are also provided. Here, by means of the first injection valve 52, the first compressor air line 32 can be shut off or at least partially released. Similarly, the second compressor air line 34 can be shut off or at least partially released by means of the second injection valve 54. The injection valves 52, 54 can also be referred to as compressor air injection valves.

Tests have proven successful in which pipes with an internal diameter of 18 mm were used for the compressor air lines 32, 34. Such pipes can be fitted or laid particularly easily and with little effort as shown schematically and by way of example in FIG. 1.

If only one compressor air line is provided to introduce the compressed air or secondary air into the exhaust gas downstream of the exhaust valves of the internal combustion engine 10, only one of the two injection valves 52, 54 shown here as an example need be provided.

In a manner known per se, fuel which is stored in a fuel tank 58 is supplied to the combustion chambers 12 during operation of the internal combustion engine 10 by means of respective injectors 56. A high-pressure pump 62 is arranged in a corresponding fuel line 60, by means of which the pressure of the fuel which is introduced into one of the combustion chambers 12 by means of one of the respective injectors 56 is increased.

Further components of the internal combustion engine 10, such as an engine oil circuit, a fuel tank ventilation system and a coolant circuit, are shown in FIG. 1. However, it is not necessary to go into more detail regarding these here.

During operation of the internal combustion engine 10, in particular following a cold start of the internal combustion engine 10, a combustion-air/fuel ratio of $\lambda<1$ in the range of $\lambda=0.7$ to 0.9 is set in the respective combustion chambers 12. Due to the accompanying rich combustion of fuel with oxygen which is contained in the air and is introduced into the combustion chambers 12 via the supply air tract 16, a high proportion of HC emissions and CO emissions is produced in the exhaust gas flowing out of the combustion chambers 12.

Furthermore, following the cold start of the internal combustion engine 10, compressed air or compressed fresh air is taken from the branch line 26 downstream of the electric additional compressor 20 and thus upstream of the throttle valve 36 and introduced into the exhaust manifold 38 via the compressor air lines 32, 34, i.e., in this case into the first exhaust gas stream 40 and the second exhaust gas stream 42. The oxygen contained in this compressed secondary air ensures exothermic oxidation of the unburned hydrocarbons (HC) and carbon monoxide (CO).

In addition, the temperature in the exhaust manifold 38 can be increased by a late centroid of combustion. In the present case, these measures result in the first catalytic converter 48 in particular being heated up particularly quickly and thus the first catalytic converter 48 reaching its start-up temperature very quickly.

The amount of air or secondary air introduced into the exhaust gas, which is supplied to the first catalytic converter 48, is adjusted via an opening width of the at least one injection valve 52, 54, i.e., via a respective opening cross section of these bypass valves, and/or via the speed of the electric additional compressor 20.

The compressor air lines 32, 34 or bypass lines or also injection channels preferably open out into the exhaust system 44 as close as possible to the exhaust valves of the internal combustion engine 10. The injection of the secondary air thus takes place according to FIG. 1 in the region of the exhaust manifold 38 or in the region of a cylinder head of the internal combustion engine 10 and this as close as possible to the exhaust valves of the combustion chambers 12 of the internal combustion engine 10.

For example, lift valves with position feedback can be used as the injection valves 52, 54. Furthermore, the parameters for the cold start of the internal combustion engine 10 can be varied in the course of tests in order to obtain a favourable activation energy for the exothermic reaction, which takes place in the exhaust manifold 38 or exhaust channel of the internal combustion engine 10, via a centroid position of the combustion.

At least one oxygen sensor, for example in the form of a first lambda sensor 64 arranged upstream of the catalytic converter 48 in the exhaust system 44, can be used to detect the oxygen content in the exhaust gas which is fed to the catalytic converter 48. This first lambda sensor 64 is designed as a broadband lambda sensor. Furthermore, according to FIG. 1, a further lambda sensor 66 is arranged in the exhaust system 44 at the level of the catalytic converter 48 as a further oxygen sensor. The oxygen content in the exhaust gas flowing through the catalytic converter 48 can also be detected by means of the further or second lambda sensor 66.

In particular, the oxygen content in the exhaust gas and thus an exhaust gas lambda can be determined by means of the first lambda sensor 64 arranged upstream of the catalytic converter 48. The speed of the electric additional compressor 20 can be set or controlled in such a way that a suitable exhaust gas lambda is set during the secondary air injection and thus in a heating-up phase of the catalytic converter 48.

The oxygen content in the exhaust gas, which is detected by means of the at least one oxygen sensor in the present case in the form of one of the lambda sensors 64, 66, is controlled during the heating-up phase of the catalytic converter 48 optionally by pilot control of the at least one injection valve 52, 54 in combination with controlling the speed of the electric additional compressor 20 or by pilot control of the speed of the electric additional compressor 20 in combination with controlling an opening width of the at least one injection valve 52, 54 or compressor air injection valve.

A superior operating strategy and release strategy of additionally introduced functionalities for the pilot control and control of these manipulated variables in the form of the opening width of the at least one injection valve 52, 54 and the speed of the electric additional compressor 20 has been created.

Advantageously, components can be used in this process that have already been tested in series production and have thus already proven their functionality. Furthermore, only a small number of additional components is required. This is advantageous with regard to a reduction of weight and costs as well as the required installation space. The latter is particularly favoured by the fact that in the present case the electric additional compressor 20 is used as a secondary air pump, which is provided anyway to increase the driving dynamics of the internal combustion engine 10.

The functional extensions, to be provided for an implementation of the method for heating up the at least one catalytic converter 48, 50, of an engine control which, in the present case, is carried out by a control unit 68 shown only schematically in FIG. 1, are advantageously modular and largely independent, except for a consideration of a filling model. Therefore, no in-depth adaptations or interventions in a fundamental functional structure of the engine control system are necessary.

The control unit 68 is designed for controlling and/or regulating the at least one injection valve 52, 56 and for controlling and/or regulating the electrically driven additional compressor 20. Accordingly, the control unit 68 can output a respective manipulated variable 90, 106 to the at least one injection valve 52, 54 and to the additional compressor 20. This will be explained with reference to FIG. 2.

Figure 2:
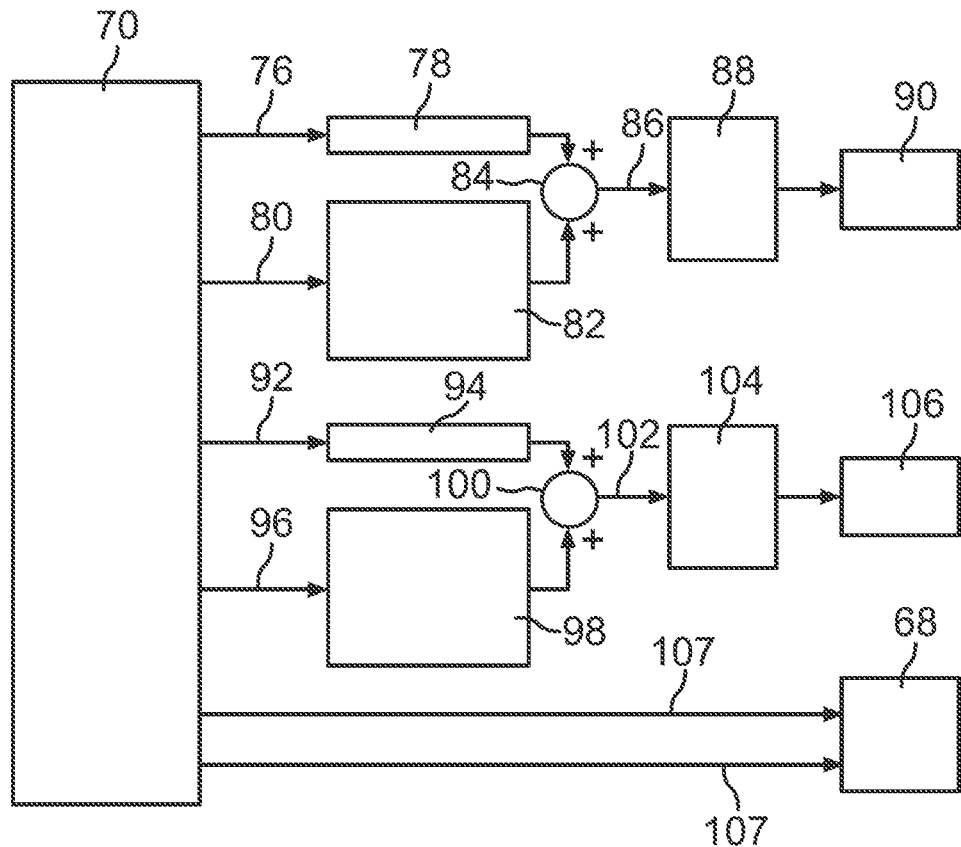
FIG. 2 shows a functional structure for such a compressor air injection into the exhaust manifold and for an adjustment of a speed of the additional compressor.

FIG. 2 shows functional blocks of operating modes which can be implemented when heating up the catalytic converter 48 by means of the compressor air injection and an adjustment of the speed of the electric additional compressor 20 carried out at this time.

In an operating strategy 70 illustrated by a first block in FIG. 2, different controller variants are provided, which can be used depending on the application or on the operating mode of the internal combustion engine 10.

On the one hand, the compressor air injection can be controlled by regulating the opening width of the at least one injection valve 52, 54 by means of a controller 72 of the control unit 68 (compare FIG. 1), whereby a speed of the electric additional compressor 20 is pilot-controlled.

In a further controller variant, the compressor air injection, i.e., the opening width of the at least one injection valve 52, 54, is pilot-controlled and the speed of the electric additional compressor 20 is controlled.

In addition, it may be provided that both the compressor air injection and thus the opening widths of the injection valves 52, 54 and the speed of the electric additional compressor 20 are controlled.

Such additional functions for heating up the catalytic converter 48 can be enabled depending on relevant engine variables. Corresponding variables taken into account in the operating strategy 70 can include a request made by the control unit 68 to heat up the catalytic converter 48.

Furthermore, a release duration can be applied in the operating strategy 70 to specify a maximum duration during which the catalytic converter 48 is to be heated. Furthermore, the operating strategy 70 can optionally include a temperature limit of the exhaust system 44. This is particularly advantageous if a suitable temperature sensor 74 (compare FIG. 1) is available, by means of which the temperature of the exhaust gas flowing through the catalytic converter 48 can be recorded. It is also conceivable to determine a temperature for determining a temperature limit from a calculation model. Furthermore, a temperature can also be provided as an abort criterion for heating up the catalytic converter 48, or a duration or release duration for heating up the catalytic converter 48 can be stipulated as a function of a determined and/or measured temperature.

Furthermore, the operating strategy 70 may provide that a speed of the internal combustion engine 10 should be above a threshold value of approximately 100 revolutions per minute so that the release is only applied when the internal combustion engine 10 is started, rather than when an ignition of the motor vehicle comprising the internal combustion engine is switched on.

Here, a time period for resetting the controller 72 can be applied so that although pilot-control values for the speed of the electric additional compressor 20 and the compressor air injection, i.e., the opening width of the at least one injection valve 52, 54, are effective immediately, the controller 72 is activated with a time delay. Alternatively, the controller can only be activated when the broadband lambda sensor 64 is ready for measurement Other engine control variables that can be adjusted as part of the operating strategy 70 can include a lambda target value during the heating-up of the catalytic converter 48 and/or a factor for a basic pilot control of an air mass supplied to the internal combustion engine 10 via the supply air tract 16.

In addition, a delay of the respective releases by application or a calculation model is made possible. For example, it is possible to wait for the validity of a measured value or to issue the release only after a diagnosis. This can be provided in particular after starting the internal combustion engine 10, whereby in particular a diagnosis of the at least one lambda sensor 64, 66 can be carried out first.

In FIG. 2, a first arrow 76 illustrates a release of a pilot control 78 of the at least one injection valve 52, 54. A further arrow 80 illustrates a release of the controller 72. Accordingly, after the release of the controller 72, a control 82 of the at least one injection valve 52, 54 can be carried out, i.e., an operating width of the at least one injection valve 52, 54 can be controlled. In this case, a lambda control of the opening width can be carried out.

The controller 72 can be designed in particular as a proportional-integral controller 72 (PI controller). Here, a proportional controller gain (Kp) and an integral controller gain (Ki) can preferably be adjusted depending on a control difference.

According to FIG. 2, a node 84 can be supplied with a pilot-control portion of the compressor air injection and controller portion of the compressor air injection. An arrow 86 extending from the node 84 illustrates a control of a diagnosis in a diagnostic block 88, in which a manipulated variable restriction can be carried out.

A result of a first branch of the functional structure shown in FIG. 2 is the manipulated variable 90 which is output to the at least one injection valve 52, 54 (compare FIG. 1). As a result of the output of this manipulated variable 90, the opening width of the respective injection valve 52, 54 is set.

In a second branch of the functional structure shown in FIG. 2, a further arrow 92 illustrates a release of a pilot control 94, wherein when the pilot control 94 is executed, the speed of the electric additional compressor 20 is pilot-controlled. A steady-state map can be used for the respective pilot controls 78, 94, which can take a load and a speed of the internal combustion engine 10 into account.

In a similar manner as that described for the at least one injection valve 52, 54, in the second branch in FIG. 2 a further arrow 96 illustrates a release of the controller 72 for a control 98 of the speed of the electrically driven additional compressor 20. Here, too, a lambda control can be carried out, in which the controller 72, preferably designed as a PI controller (compare FIG. 1), is used. Here, too, controller gains in the form of proportional gain (Kp) and integral gain (Ki) can preferably be adjusted depending on a control difference.

Respective arrows also lead from the blocks, which in FIG. 2 illustrate the pilot control 94 and the control 98 of the additional compressor 20, to a node 100, as in the first branch of the functional structure. A pilot control portion of the speed of the additional compressor 20 or a controller portion of the speed of the additional compressor 20 can thus be supplied to the node 100.

An arrow 102 departing from the node 100 leads to a diagnostic block 104 in which a manipulated variable restriction can be made. One result of the second branch of the functional structure or functional strategy shown in FIG. 2 is the manipulated variable 106 which can be output by the control unit 68 to the electric additional compressor 20 (compare FIG. 1). As a result of this manipulated variable 106 being output, the speed of the electric additional compressor 20 is set.

Further arrows 107 in FIG. 2 illustrate possible adjustments of variables in the engine control implemented in the control unit 68. These variables may include, as mentioned, a lambda target value when heating up the catalytic converter 48 and a factor in the basic pilot control of the mass of air supplied to the internal combustion engine 10 via the supply air tract 16.

In the present case, measures are taken to reduce fluctuations of the control variable lambda. These measures include freezing or keeping constant the respective controller manipulated variable, in the present case one of the manipulated variables 90, 106, close to the target value.

Possible control levers for effective compressor air injection for heating up the catalytic converter 48 or the catalytic converters 48, 50 include, in particular, a compressor air release and a delayed compressor air release. Furthermore, the respective controller variant can be predetermined.

In particular, it can be predetermined that the opening width of the at least one injection valve 52, 54 is kept constant as the manipulated variable 90 output by the controller 72 (compare FIG. 1) as soon as the manipulated variable 90 is close to the target value. In this controller variant, the speed of the additional compressor 20 is pilot-controlled by means of the controller 72. The pilot control 94 of the additional compressor 20 and the control 82 of the opening width of the at least one injection valve 52, 54 (compare FIG. 2) are therefore implemented until an actual value of the oxygen content in the exhaust gas, which is fed to the catalytic converter 48, has sufficiently approached a target value 114 (compare FIG. 4) of the oxygen content by outputting the manipulated variable 90. The actual value of the oxygen content can be detected, for example, by means of the first lambda sensor 64.

In an alternative controller variant, the speed of the additional compressor 20 is kept constant as the manipulated variable 106 output by the controller 72 as soon as the manipulated variable 106 is close to the target value. In this alternative controller variant, the opening width of the at least on injection valve 52, 54 is pilot-controlled by means of the controller 72. The pilot control 78 of the opening width of the at least one injection valve 52, 54 and the control 98 of the additional compressor 20 (compare FIG. 2) are therefore implemented until the actual value of the oxygen content in the exhaust gas, which is fed to the catalytic converter 48, has sufficiently approached the target value (compare FIG. 4) of the oxygen content by outputting the manipulated variable 106. Here, too, the actual value of the oxygen content can be detected, for example, by means of the first lambda sensor 64.

In other words, the manipulated variable 90, 106 output by the controller 72 on the basis of a deviation of the actual value of the oxygen content in the exhaust gas from the target value 114 of the oxygen content can be kept constant, i.e., the controller 72 can be effectively frozen when the actual value is sufficiently close to the target value 114.

The corresponding control levers can be used in different combinations depending on a series of input variables to ensure effective heating of the at least one catalytic converter 48, 50. For example, an operating point of the internal combustion engine 10 can be taken into account, such as a load and/or a speed and/or a temperature and/or a dynamic of the internal combustion engine 10 or the like.

Furthermore, the surroundings information from a route planning of a navigation system of the motor vehicle comprising the internal combustion engine 10 and/or car-to-car information can be taken into account.

In particular, it has been shown that in steady-state tests of the internal combustion engine 10 on a test bench, a combination of pilot control 78 of the opening width of the at least one bypass valve or injection valve 52, 54 with control 98 of the speed of the electric additional compressor 20 is well suited to achieving low emissions in the exhaust gas leaving the exhaust system 44 into the surroundings. In the case of dynamic operation of the internal combustion engine 10, however, another variant may be particularly suitable, so that corresponding variants can be stored in the operating strategy 70 (compare FIG. 2).

For example, provision can be made to switch from the controller variant in which the opening width of the at least one injection valve 52, 54 is kept constant after initial control 82, while the speed of the additional compressor 20 is pilot-controlled, to the controller variant in which the speed of the additional compressor 20 is kept constant after initial control 98, while the opening width of the at least one injection valve 52, 54 is pilot-controlled. Such a switchover can be carried out in particular if a dynamic increase is identified with regard to the load and/or speed of the internal combustion engine 10. The two controller variants can also be used in combination and, if required, also as multi-variable control.

Figure 3:
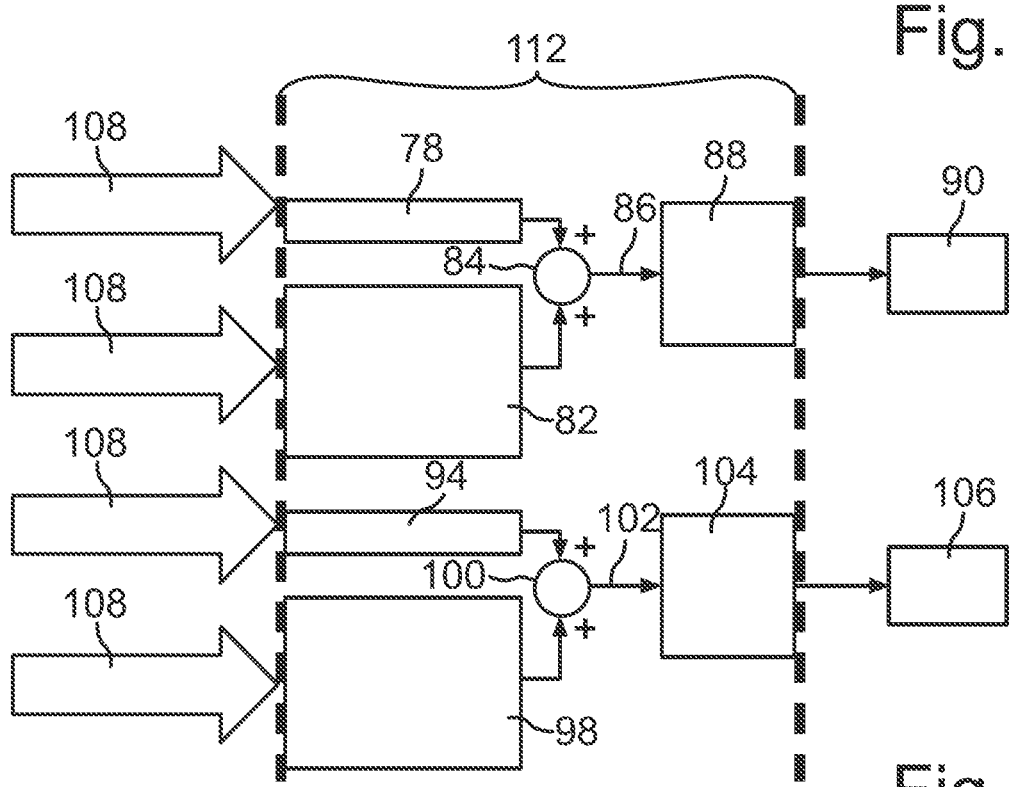
FIG. 3 shows a controller structure, comprising the functional structure as per FIG. 2, with two control variants.

In FIG. 3, a plurality of arrows 108 illustrate input parameters supplied to the controller 72. These input parameters can include operating point information such as a load and/or a speed and/or a temperature of the internal combustion engine 10.

Figure 4:
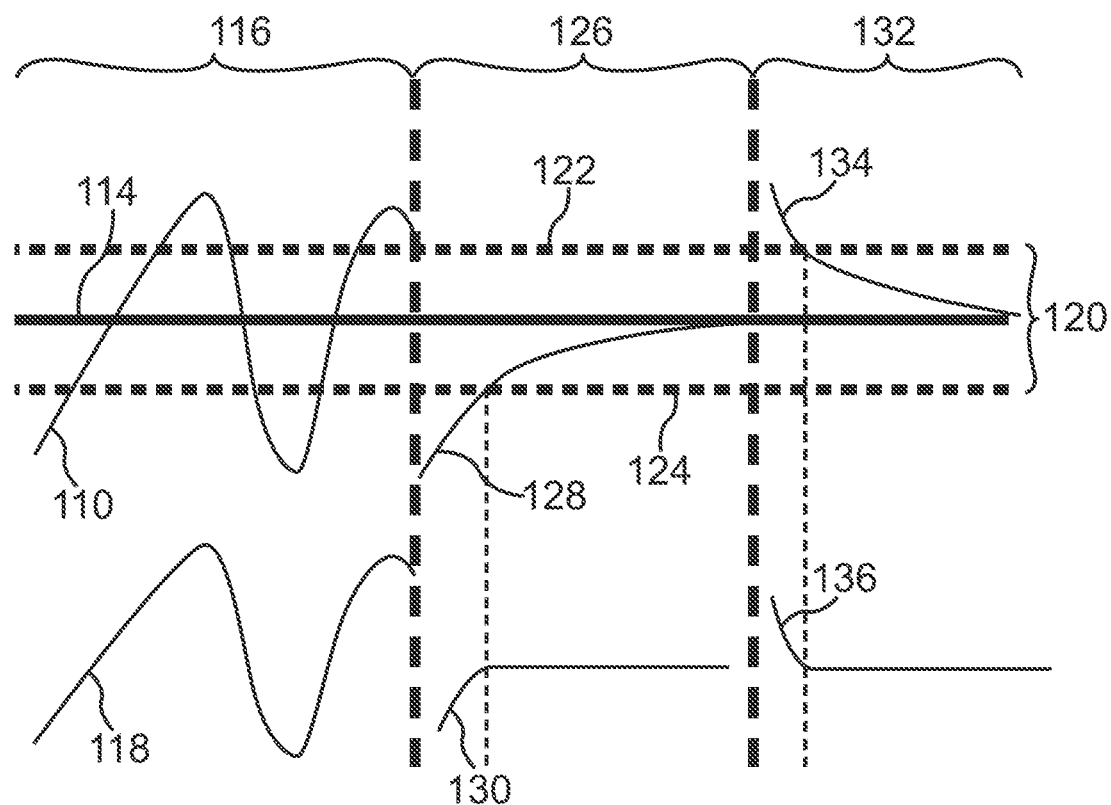
FIG. 4 shows a possible execution of the control system in which a controller manipulated variable is frozen or kept constant.

Furthermore, these input parameters or input variables can include the actual value of the oxygen content in the exhaust gas fed to the catalytic converter 48. Curves 110, 128, 134 illustrating possible actual values of the oxygen content are shown in FIG. 4. The actual value can be provided in particular by the first lambda sensor 64 and/or by the second lambda sensor 66.

An input block comprising the arrows 108 is shown in FIG. 3 delimited from a calculation block 112, which essentially includes the two branches of the functional structure shown in FIG. 2, including the respective diagnostic blocks 88, 104. As explained above, during the control 82 of the opening width of the at least one injection valve 52, 54, for example, the manipulated variable 90 can freeze for the purpose of stable operation of the controller 72 if the actual value of the oxygen content is close to the target value 114, which is illustrated by a horizontal line in FIG. 4.

Similarly, if the pilot control 78 of the at least one injection valve 52, 54 is activated and the speed of the electric additional compressor 20 is initially controlled, i.e., the control 98 is active (compare FIG. 2), the manipulated variable 106 can be frozen. This freezing or keeping constant of the manipulated variable 106 also preferably takes place when the actual value of the oxygen content in the exhaust gas fed to the catalytic converter 48 is close to the target value 114, which is illustrated by the horizontal line in FIG. 4.

Thus, depending on the operating state of the internal combustion engine 10, the pilot control 78 of the at least one injection valve 52, 54 for compressor air injection or the pilot control 94 of the speed of the electric additional compressor 20 takes place. The pilot control values can be stored application-wise as fixed values. Alternatively, the pilot control values can result from a physically motivated model approach.

In addition to the pilot control of the compressor air injection and the adjustment of the speed of the electric additional compressor 20, respectively, the control 82, 98 of the adjusted combustion lambda value is useful in order to achieve the fastest possible heating of the catalytic converter 48 with favourable raw emissions.

The proportional-integral controller 72 (PI controller) is preferably provided as the operating principle for the controller 72 for controlling the compressor air injection, i.e., the opening width of the at least one injection valve 52, 54 or the speed of the electric additional compressor 20. Here, the controller gains can preferably be adjusted depending on a control difference, and this can be carried out application-wise or according to specifications from the operating strategy 70 (compare FIG. 2).

In addition, the freezing or keeping constant of the respective manipulated variable 90, 106 of the controller 72 near the target value is implemented. This freezing or keeping constant of the respective manipulated variable 90, 106 can be requested by the operating strategy 70.

FIG. 4 schematically shows the procedure for freezing, or keeping constant, the manipulated variable 90, 106 output by the controller 72 when the actual value approaches the target value 114.

In a first section 116 of the diagram shown in FIG. 4, it is illustrated by the curve 110 that there may be fluctuations in the actual value of the oxygen content in the exhaust gas fed to the at least one catalytic converter 48, 50. This oxygen content can be detected by means of the at least one oxygen sensor in the form of one of the lambda sensors 64, 66.

A further curve 118 in FIG. 4 illustrates corresponding fluctuations in the manipulated variable 90 output by the controller 72 in the control 82 (compare FIG. 2) of the opening width of the injection valve 52, 54 when the speed of the additional compressor 20 is pilot-controlled. Similarly, such a fluctuation of the manipulated variable 106, illustrated by curve 118, can occur when the opening width of the at least one injection valve 52, 54 is pilot-controlled and the control 98 (compare FIG. 2) of the speed of the additional compressor 20 is carried out by the controller 72.

The oscillations of the respective manipulated variable 90, 106 illustrated by curve 118 can be caused by the fact that, due to the design of the compressor air lines 32, 34 (compare FIG. 1), delays occur between the output of the respective manipulated variable 90, 106 and the resulting oxygen content which is to be set in the exhaust gas. However, this oxygen content should actually be set as precisely as possible via the amount of compressor air to be supplied by the additional compressor 20.

In order to counteract these oscillations or fluctuations in the manipulated variable 90, 106, this manipulated variable 90, 106 output by the controller 72 on the basis of a deviation of the actual value from the target value 114 is kept constant or frozen as soon as the actual value enters a value range 120 (compare FIG. 4) within which the target value 114 is located.

As can be seen in FIG. 4, the value range 120 is delimited by an upper limit value 122 and a lower limit value 124. The upper limit value 122 is illustrated in FIG. 4 by a dotted horizontal line, and the lower limit value 124 is also illustrated by a dotted horizontal line. As soon as the actual value reaches one of the two limit values 122, 124, the manipulated variable 90, 106 output by the controller 72 is kept constant so that no further control 82 (compare FIG. 2) of the opening width of the injection valves 52, 54 or no further control 98 (compare FIG. 2) of the speed of the additional compressor 20 takes place.

In FIG. 4, in a further section 126, the curve 128 illustrates a case in which the actual value of the oxygen content reaches the lower limit value 124. The actual value of the oxygen content in the exhaust gas fed to the catalytic converter 48 is thus represented in this section 126 by the curve 128.

A further curve 130 in FIG. 4 illustrates the progression over time of the manipulated variable 90, 106 output by the controller 72 in the case of control 82 or in the case of control 98 (compare FIG. 2). Thus, if the control 82 is active first, the manipulated variable 90 is kept constant when the lower limit value 124 is reached. And if the control 98 is active first, then the control value 106 is kept constant when the lower limit value 124 is reached.

The outputting of this constant manipulated variable 90, 106 is illustrated in section 126 in FIG. 4 by a horizontal progression of the curve 130. This horizontal progression begins when the curve 128 intersects the line indicating the lower limit value 124.

Similarly, in FIG. 4, in a further section 132, the further curve 134 illustrates a possible progression over time of the actual value of the oxygen content, which is detected in the exhaust system 44 by means of the at least one lambda sensor 64, 66 during the control 82 of the opening width or during the control 98 of the speed (compare FIG. 2).

In the further section 132, however, the curve 134 reaches the upper limit value 122. Even when the actual value reaches this upper limit value 122, the manipulated variable 90, 106 output by the controller is kept constant. Here, too, however, the manipulated variable 90 is thus kept constant if the control 82 was previously active, and the manipulated variable 106 is kept constant if the control 98 was previously active (compare FIG. 2).

This keeping constant of the manipulated variable 90, 106 output by the controller is illustrated in the further section 132 in FIG. 4 by a further curve 136. This further curve 136 shown in the section 132 also shows a horizontal progression over time as soon as the curve 134 intersects the line which illustrates the upper limit value 122 in FIG. 4.

Both in the case illustrated in the second section 126 in FIG. 4 and in the case illustrated in the third section 132 in FIG. 4, the curve 128, 134 indicating the actual value finally reaches the target value 114.

It may be possible to improve or avoid the surge effect shown in the first section 116 by accurately taking into account the amount of compressor air in a filling model of the engine control system. However, in particular in the case of dynamic operation of the internal combustion engine 10, it is useful to freeze or keep constant the manipulated variable 90, 106 output by the controller 72. This keeping constant of the manipulated variable 90, 106 is therefore preferably carried out as soon as the actual value reaches one of the two limit values 122, 124 within which the target value 114 is located.

The two limit values 122, 124 delimiting the value range 120 can deviate from the target value 114 by approximately 3%, for example. In this way, it can be ensured that the manipulated variable 90, 106 is only frozen or kept constant when the actual value is in a correspondingly close proximity to the target value 114.

LIST OF REFERENCE CHARACTERS

10 Internal combustion engine
12 Combustion chamber
14 Spark plug
16 Supply air tract
18 Exhaust gas turbocharger
20 Additional compressor
22 Compressor wheel
24 Line branch
26 Branch line
28 Compressor wheel
30 Charge air cooler
32 Compressor air line
34 Compressor air line
36 Throttle flap
38 Exhaust manifold 40 Exhaust stream
42 Exhaust stream
44 Exhaust system
46 Turbine wheel
48 Catalytic converter
50 Catalytic converter
52 Injection valve
54 Injection valve
56 Injector
58 Fuel tank
60 Fuel line
62 High-pressure pump
64 Lambda sensor
66 Lambda sensor
68 Control unit
70 Operating strategy
72 Controller
74 Temperature sensor
76 Arrow
78 Pilot control
80 Arrow
82 Control
84 Node
86 Arrow
88 Diagnostic block
90 Manipulated variable
92 Arrow
94 Pilot control
96 Arrow
98 Control
100 Node
102 Arrow
104 Diagnostic block
106 Manipulated variable
107 Arrow
108 Arrow
110 Curve
112 Calculation block
114 Target value
116 Section
118 Curve
120 Value range
122 Limit value
124 Limit value
126 Section
128 Curve
130 Curve
132 Section
134 Curve
136 Curve

The invention claimed is:

1. A method for heating a catalytic converter (48) which is disposed in an exhaust system (44) of a spark-ignition internal combustion engine (10), wherein a control unit (68) outputs a respective manipulated variable to an electrically driven additional compressor (20) and to at least one injection valve (52, 54), wherein as a result of the at least one injection valve (52, 54) being at least partially opened, air compressed by the electrically driven additional compressor (20) is introducible into the exhaust system (44) downstream of exhaust valves of the spark-ignition internal combustion engine (10) which are assigned to respective combustion chambers (12) of the spark-ignition internal combustion engine (10), and wherein signals from at least one oxygen sensor (64, 66), via which an oxygen content in exhaust gas fed to the catalytic converter (48) is detected, are supplied to a controller (72) of the control unit (68);

the method comprising the steps of:
a) switching on the electrically driven additional compressor (20);
b) at least partially opening the at least one injection valve (52, 54);
c) setting a combustion-air/fuel ratio of $\lambda<1$ in the combustion chambers (12) of the spark-ignition internal combustion engine (10);
d) detecting an actual value (128, 134) of the oxygen content in the exhaust gas by the at least one oxygen sensor (64, 66); and
e) comparing the actual value (128, 134) with a target value (114) of the oxygen content, wherein the target value corresponds to an exhaust-gas oxygen content that would be set in a region of the catalytic converter (48) if the combustion-air/fuel ratio in the combustion chambers (12) of the spark-ignition internal combustion engine (10) is approximately $\lambda=1$, wherein a manipulated variable (90, 106) output by the controller (72) on a basis of a deviation of the actual value (128, 134) from the target value (114) is kept constant when the actual value (128, 134) reaches one of two limit values (122, 124) of a value range (120) within which the target value (114) is ranged, and wherein the two limit values (122, 124) of the value range (120) deviate from the target value (114) by approximately 3%.

2. The method according to claim 1, wherein a speed of the electrically driven additional compressor (20) is pilot-controlled and wherein an opening width of the at least one injection valve (52, 54) is adjusted in such a way that the target value of the oxygen content in the exhaust gas is set.

3. The method according to claim 1, wherein an opening width of the at least one injection valve (52, 54) is pilot-controlled and wherein a speed of the electrically driven additional compressor (20) is controlled in such a way that the target value of the oxygen content in the exhaust gas is set.

4. The method according to claim 1, wherein the steps a) to e) are carried out following a cold start of the spark-ignition internal combustion engine (10).

5. The method according to claim 1, wherein the steps a) to e) are carried out when a speed of the spark-ignition internal combustion engine (10) exceeds a threshold value of 100 revolutions per minute.

6. The method according to claim 1, wherein the catalytic converter (48) is operated as a three-way catalytic converter.

7. The method according to claim 1, wherein the controller (72) is a proportional-integral controller.

8. The method according to claim 1, wherein in step c), in addition to the setting, an ignition instant of a spark plug (14) assigned to the respective combustion chamber (12) of the spark-ignition internal combustion engine (10) is shifted to an instant that is later in time than in normal operation of the spark-ignition internal combustion engine (10).

* * * * *